(12) United States Patent
Tomita et al.

(10) Patent No.: US 7,173,244 B2
(45) Date of Patent: Feb. 6, 2007

(54) RADIATION DETECTOR

(75) Inventors: Yasuhiro Tomita, Hamamatsu (JP);
Masanori Kinpara, Hamamatsu (JP);
Michiatsu Nakada, Hamamatsu (JP);
Yuji Shirayanagi, Hamamatsu (JP);
Shinjiro Matsui, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 153 days.

(21) Appl. No.: 10/514,011

(22) PCT Filed: May 14, 2003

(86) PCT No.: PCT/JP03/06024

§ 371 (c)(1),
(2), (4) Date: Nov. 10, 2004

(87) PCT Pub. No.: WO03/096069

PCT Pub. Date: Nov. 20, 2003

(65) Prior Publication Data

US 2005/0199818 A1    Sep. 15, 2005

(30) Foreign Application Priority Data

May 14, 2002    (JP)    ............................. 2002-138959

(51) Int. Cl.
*G01T 1/16* (2006.01)

(52) U.S. Cl. ................. 250/336.1; 250/370.01
(58) Field of Classification Search .............. 250/336.1
See application file for complete search history.

(56) References Cited

U.S. PATENT DOCUMENTS

| | | | | |
|---|---|---|---|---|
| 3,122,635 A * | 2/1964 | Ludlum | ...................... | 250/369 |
| 4,995,396 A * | 2/1991 | Inaba et al. | .................. | 600/431 |
| 5,068,883 A * | 11/1991 | DeHaan et al. | ............... | 378/86 |
| 5,363,089 A * | 11/1994 | Goldenberg | ................ | 340/7.63 |
| 5,557,108 A * | 9/1996 | Tumer | ................... | 250/390.04 |
| 6,236,880 B1 * | 5/2001 | Raylman et al. | ............ | 600/436 |
| 6,771,802 B1 * | 8/2004 | Patt et al. | .................... | 382/128 |

FOREIGN PATENT DOCUMENTS

| | | |
|---|---|---|
| JP | 58-066882 | 4/1983 |
| JP | 09-189770 | 7/1997 |
| JP | 2000-510362 | 8/2000 |
| WO | WO 01/00095 A1 | 1/2001 |

* cited by examiner

Primary Examiner—Albert Gagliardi
(74) Attorney, Agent, or Firm—Drinker Biddle & Reath LLP

(57) ABSTRACT

A radiation detector having a head and a main body. The head has a probe and a first articulation. The probe contains a radiation detection element, and is movable due to the first articulation. Separately from the first articulation, a second articulation is provided on the main body or the head or therebetween. Accordingly, the radiation detector can move in a different way that allowed for by the first articulation. Combining the motion by the first articulation with the motion by the second articulation increases flexibility of handling the radiation detector. Hence the radiation detector has improved ease of operation.

18 Claims, 14 Drawing Sheets

RADIATION DETECTOR

TECHNICAL FIELD

The present invention relates to a radiation detector, and, for example, to a radiation detector for detecting radioactive material existing in the tissue of a body.

BACKGROUND ART

In a test for metastasis of cancer, it has been carried out to administer radioactive medicine into a body and detect radioactive material agglomerated in the tissue of the body, thereby specifying the position of the tissue to which the cancer metastasizes. An example of a radiation detector used to detect radioactive material is described in U.S. Pat. No. 6,236,880 B1. This radiation detector is of a hand held type. In this radiation detector, a curved tube is connected to the distal end of the main body, and various probe distal ends can be mounted on the distal end of the tube. A radiation detection element is built into each probe distal end.

In the field of the radiation detector, a radiation detector which is easier to handle has been required to quickly detect radioactive material in a body.

DISCLOSURE OF THE INVENTION

It is an object of the invention to improve ease of operation of the radiation detector.

The radiation detector according to the present invention has a main body, and a head connected to an end of the main body. The main body has a grip. The head has a probe and a first articulation. The probe contains a radiation detection element. The first articulation is connected to the probe. For example, the radiation detection element may be disposed at the distal end of the probe, and the first articulation may be connected to the proximal end of the probe. The first articulation enables the probe to move. A second articulation is provided to the main body or the head or between the main body and the head. This enables the radiation detector to move in different ways that allowed for by the first articulation. The second articulation may enable the head to move with respect to the grip. Combining the motion based on the first articulation with the motion based on the second articulation increases flexibility of handing the radiation detector. Hence the radiation detector according to the present invention has improved ease of operation.

The present invention can be sufficiently understood from the following detailed description and accompanying drawings. The accompanying drawings are merely examples, and thus it should be noted that the accompanying drawings do not limit the present invention.

A further application field of the present invention will be clear from the following detailed description. However, the detailed description and specific examples show the preferred embodiments of the present invention, however, they are merely examples. Various modifications and alterations within the purpose and scope of the present invention will be apparent by persons skilled in the art from the detailed description.

BEST MODES FOR CARRYING OUT THE INVENTION

Figure 1A:
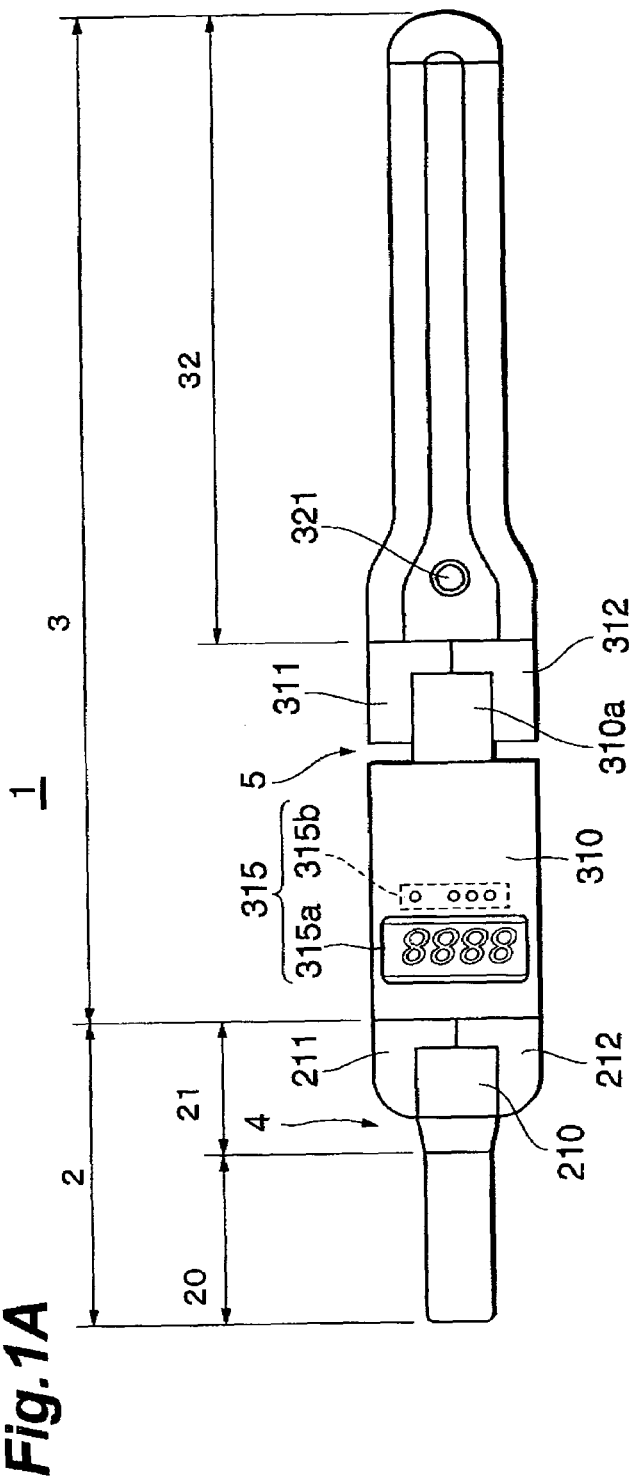
FIG. 1A and FIG. 1B are a plan view and a side view generally showing a radiation detector according to a first embodiment.

Embodiments according to the present invention will be described in detail with reference to the accompanying drawings. In the description of the drawings, the same elements are represented by the same reference numerals and overlapping description is omitted.

First Embodiment

Figure 1B:
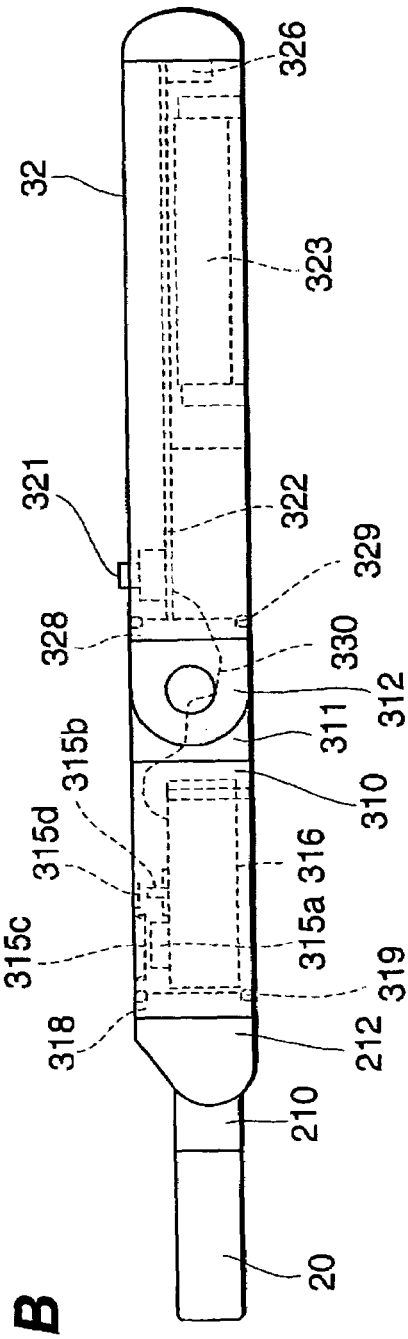

FIGS. 1A and 1B are a plan view and a side view generally showing a radiation detector 1 according to a first embodiment. The radiation detector 1 is a wireless and hand held type detector. The radiation detector 1 has a head 2 and a main body 3. The head 2 is provided with an articulation 4. The main body 3 is provided with an articulation 5.

The head 2 has a probe 20 and a base 21. The probe 20 is disposed at the distal end of the radiation detector 1. The proximal end of the probe 20 is connected to the distal end of the base 21. The proximal end of the base 21 is connected to the distal end of the main body 3. The base 21 constitutes the articulation 4. The articulation 4 enables the probe 20 to swing. The base 21 has a probe fixing member 210 and holding members 211 and 212. The probe 20 is fixed to the probe fixing member 210. The probe fixing member 210 is held between the holding members 211 and 212 so as to be able to swing.

The main body 3 has a grip 32 and an intermediate portion 310 sandwiched between the grip 32 and the head 2. The distal end of the intermediate portion 310 is connected to the holding members 211 and 212. The proximal end of the intermediate portion 310 is connected to the grip 32 via the articulation 5.

The intermediate portion 310 is provided with a display section 315. The display section 315 has a display screen 315a and an LED group 315b. A measurement value of radiation detection is displayed on the display screen 315.

The LED group 315b is turned on in accordance with the operation state of the radiation detector 1 and the residual quantity of a battery. The display section 315 may be provided to the grip 32. The display section 315 may show the measurement value with a Beep sound, a Wave sound or a voice readout of a count value. These sounds are reproduced from a speaker 326, and the speaker 326 is disposed at the proximal end of the grip 32.

A joint 310a is provided to the proximal end of the intermediate portion 310. The joint 310a is sandwiched by the holding members 311 and 312 so as to be able to swing. The joint 310a and the holding members 311 and 312 constitute the articulation 5. The articulation 5 enables the intermediate portion 310 to swing with respect to the grip 32. The holding members 311 and 312 are connected to the grip 32. The grip 32 is designed in such a shape that the user can easily grasp the grip 32. The grip 32 is provided with an ON/OFF switch 321. The user can turn the radiation detector 1 on and off by pressing the switch 321.

Referring to FIG. 1B, a control circuit 316 is disposed in the intermediate portion 310. The control circuit 316 includes a signal amplifying circuit, a voltage step up device for the voltage applied to a radiation detection element, etc. The display screen 315a and the LED group 315b are placed above the control circuit 316. Transparent window portions 315c and 315d are provided above the display screen 315a and the LED group 315b. The window portions 315c and 315d are disposed in the side wall of the intermediate portion 310.

A switching circuit 322 and a power source section 323 are provided in the grip 32. The switching circuit 322 is electrically connected to the switch 321. The switching circuit 322 is electrically connected to the control circuit 316 by a cable 330. The cable 330 is, for example, a multi-axial cable or flat cable. A battery is disposed in the power source section 323. The power source section 323 is electrically connected to the switching circuit 322. The switching circuit 322 supplies power from the power source section 323 to the control circuit 316 or stops the power supply in response to pressing the switch 321. However, a section which is required to be supplied with power at all times, for example, CPU for recognizing ON/OFF of the switch 321 is supplied with power irrespective of ON/OFF of the switch 321. When supplied with power, the control circuit 316 turns on a predetermined LED of the LED group 315b, and drives the display screen 315a.

When using the radiation detector 1, the user grasps the grip 32, turns the switch 321 on, and then aims the head 2 at an object to be examined. The detection result is displayed on the display screen 315a.

Figure 2:
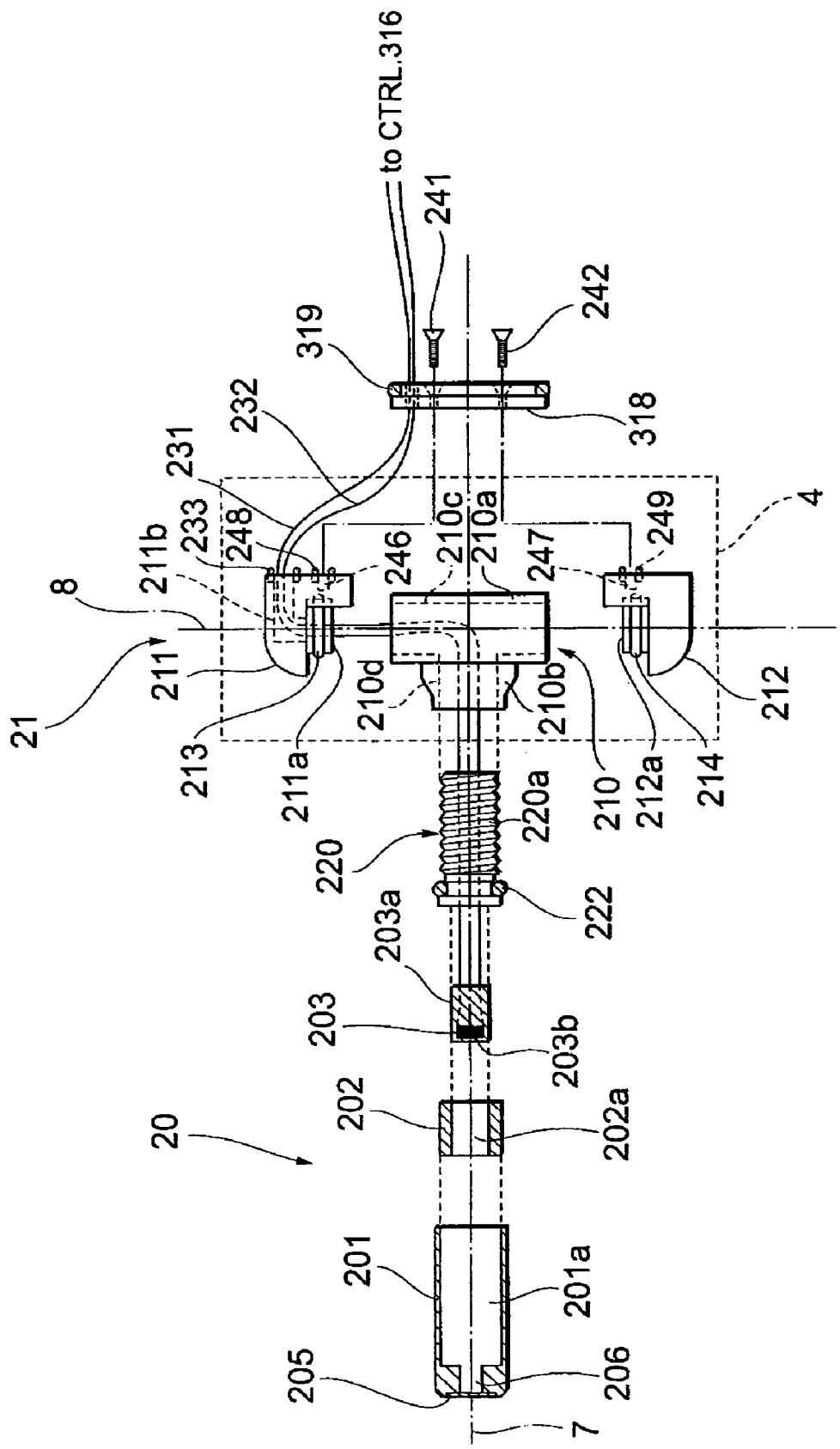
FIG. 2 is an exploded partial cross-sectional view showing the structure of a head.
Figure 3:
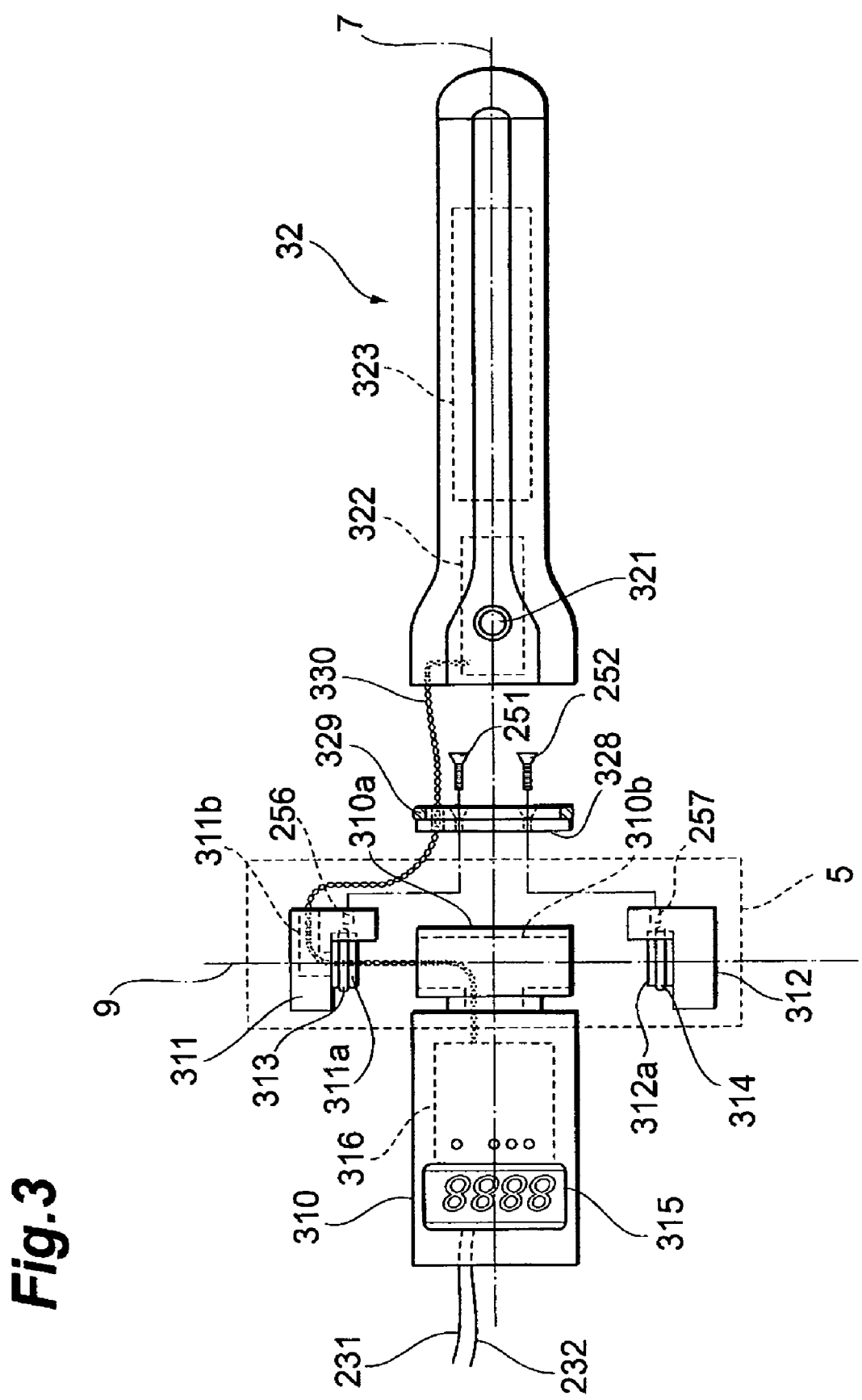
FIG. 3 is an exploded view showing the structure of a main body.
Figure 4:
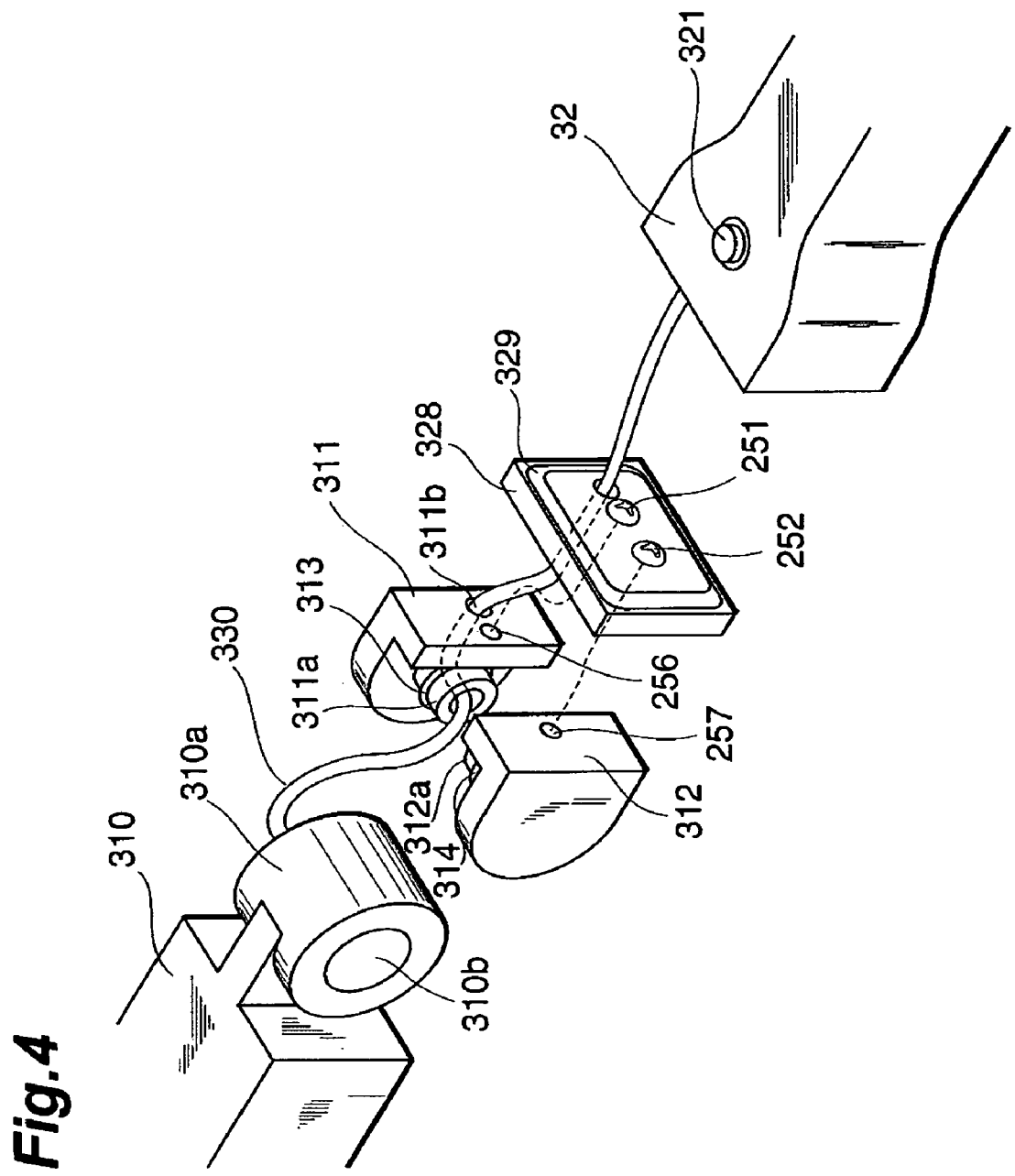
FIG. 4 is an exploded perspective view showing a moving mechanism of an intermediate portion.

The structure of the radiation detector 1 will be described in detail with reference to FIGS. 2 to 4. FIG. 2 is an exploded partial cross-sectional view mainly showing the structure of the head 2. FIG. 3 is an exploded view showing the structure of the main body 3. FIG. 4 is an exploded perspective view showing a moving mechanism of the intermediate portion 310.

First, the structure of the probe 20 will be described. The probe 20 has a probe cover 201, a side shield 202 and a radiation detection element 203. These elements have axially symmetrical shapes, respectively.

The probe cover 201 has a substantially cylindrical shape. A radiation incident window 205 is disposed at the distal end of the probe cover 201. The side shield 202 is accommodated and fixed in the hollow portion 201a of the cover 201 so as to coaxially extend along the center axis 7 of the cover 201. The side shield 202 has a substantially cylindrical shape. A semiconductor radiation detection element 203 is accommodated in the hollow portion 202a of the side shield 202. The radiation detection element 203 is accommodated in a substantially cylindrical element case 203a. The element 203 has a detection face 203b for receiving radiation. The detection face 203b is located at the distal end of the element case 203a. The element 203 generates an electrical output in response to incidence of radiation on the detection face 203a. The element case 203a is inserted in the hollow portion 202a of the side shield 202 coaxially along the axis 7, and fixed therein. The side shield 202 blocks off the radiation coming from the side of the detector 1 that originates from the portions other than the detection portion of the object to be examined and results in causing detection noise, thereby enhancing the detection precision.

An elongated and cylindrical-shaped collimating opening 206 communicating with the hollow portion 201a is further provided on the distal end of the probe cover 201. The cross section area perpendicular to the axis 7 of the collimating opening 206 is set to be smaller than those of the hollow portion 201a and the element case 203a. The collimating opening 206 extends from the back side of the window 205 to the detection face 203b of the element 203. The collimating opening 206 collimates the radiation transmitted through the window 205. This blocks off the radiation coming from the side of the detector 1 that originates from the portions other than the detection portion of the object to be examined and causes the detection noise, and thereby enhancing the detection precision.

The structure of the base 21 will now be described. As described above, the base 21 consists of the probe fixing member 210 and the holding members 211 and 212. The holding members 211 and 212 holding the probe fixing member 210 therebetween so that the probe fixing member 210 is able to swing.

The probe fixing member 210 has a main body 210a extending along the axis 8, and a protrusion 210b extending along a direction perpendicular to the axis 8. The main body 210a is provided with a through hole 210c extending along the axis 8. The through hole 210c is designed to be substantially circular in section. The protrusion 210b is provided with a through hole 210d extending along a direction perpendicular to the axis 8. The through holes 210c and 210d communicate with each other. A female screw is formed in the inner surface of the protrusion 210b.

The holding member 211 has an insertion portion 211a which extends along the axis 8 and has a substantially cylindrical shape. An O ring 213 is mounted on the outer surface of the insertion portion 211a. The insertion portion 211a and the O ring 213 is inserted in one of the end portions of the through hole 210c of the probe fixing member 210. As a result, the O ring 213 is sandwiched between the inner surface of the probe fixing member 210 and the outer surface of the insertion portion 211a. A screw hole 246 is provided on the rear end face of the holding member 211. The holding member 211 is provided with a through hole 211b for wiring.

As in the case of the holding member 211, the holding member 212 has an insertion portion 212a. The insertion portion 212a extends along the axis 8, and has a substantially cylindrical shape. An O ring 214 is mounted on the outer surface of the insertion portion 212a. The insertion portion 212a and the O ring 214 are inserted in the end portion of the through hole 210c of the probe fixing member 210 at the opposite side to the holding member 211. As a result, the O ring 214 is sandwiched between the inner surface of the probe fixing member 210 and the outer surface of the insertion portion 212a. A screw hole 247 is provided on the rear end face of the holding member 212.

As described above, the holding members 211 and 212 hold the probe fixing member 210 therebetween via the O rings 213 and 214, thereby sealing the articulation 4. The O rings 213 and 214 are slidably in contact with the inner surface of the probe fixing member 210. Accordingly, the probe fixing member 210 is able to swing around the axis 8 with respect to the holding members 211 and 212. The insertion portions 211a and 212a form a swing shaft.

The probe 20 is fixed to the probe fixing member 210 by using a connection pipe screw 220. A male screw 220a is formed on the outer surface of the connection pipe screw 220. The male screw 220a is engaged with the female screw formed on the inner surface of the protrusion 210b of the probe fixing member 210. A sealing O ring 222 is mounted on the surface of the distal end portion of the connection pipe screw 220.

The distal end portion of the connection pipe screw 220 is inserted in the probe cover 201 along the axis 7. As a result, the O ring 222 is sandwiched between the inner surface of the probe cover 201 and the outer surface of the connection pipe screw 220, thereby sealing the probe 20. The distal end portion of the connection pipe screw 220 is located behind the side shield 202 and the radiation detection element 203 in the probe 20.

When the connection pipe screw 220 is inserted in the probe cover 201, the screw-provided rear end portion of the connection pipe screw 220 is projected from the probe cover 201. Therefore, by screwing the screw-provided rear end portion into the protrusion 210b of the probe fixing member 210, the probe 20 can be fixed to the probe fixing member 210. When the probe 20 is fixed to the probe fixing member 210, the axis 7 and the axis 8 are perpendicular to each other. Since the probe fixing member 210 is able to swing, the probe 20 is able to swing around the axis 8. As described above, the base 21 acts as the articulation 4 for enabling the probe 20 to move.

Lead wires 231 and 232 are bonded to the radiation detection element 203. The lead wires 231 and 232 are connected to the control circuit 316. The output of the radiation detection element 203 is transmitted to the control circuit 316 through these lead wires. The lead wires 231 and 232 pass through the hollow portion of the connection pipe screw 220, the through holes 210d and 210c of the probe fixing member 210 and the through hole 211b of the holding member 211.

A support plate 318 is fixed to the rear end of the base 21 using screws. Two holes are formed in the support plate 318 so as to penetrate through the support plate 318. The screws 241 and 242 are inserted in these holes. The distal ends of the screws 241 and 242 project from the support plate 318. Sealing O rings 248 and 249 are mounted on the distal ends of the screws 241 and 242. These distal ends are screwed into the screw holes 246 and 247 of the holding members 211 and 212 respectively, whereby the support plate 318 is fixed to the rear end surfaces of the holding members 211 and 212.

The support plate 318 is designed in such a shape that two flat plates different in area are coaxially overlapped with each other. An O ring 319 is mounted on the outer periphery of the flat plate having the smaller area. The support plate 318 is accommodated in the intermediate portion 310. The O ring 319 is sandwiched between the inner surface of the intermediate portion 310 and the outer peripheral surface of the support plate 318, thereby sealing the intermediate portion 310.

In addition to the through hole for the screw, a through hole for wiring is provided in the support plate 318. The lead wires 231 and 232 pass through the hole for wiring, and extend to the control circuit 316 in the intermediate portion 310. The wiring hole of the support plate 318 face the through hole 211b of the holding member 211. A sealing O ring 233 is disposed between the wiring hole and the through hole 211b.

The structures of the intermediate portion 310 and the articulation 5 will now be described with reference to FIG. 3 and FIG. 4. The articulation 5 consists of the joint 310a of the intermediate portion and the holding members 311 and 312. The holding members 311 and 312 hold the intermediate portion 310 therebetween so that the intermediate portion 310 is able to swing.

The distal end of the intermediate portion 310 is connected to the head 2 through the support plate 318. The joint 310a is integrally provided to the rear end of the intermediate portion 310. The joint 310a is provided with a through hole 310b. The joint 310a is held between the holding members 311 and 312.

The holding member 311 has an insertion portion 311a. The insertion portion 311a extends along the axis 9, and has a substantially cylindrical shape. An O ring 313 is mounted on the outer surface of the insertion portion 311a. The insertion portion 311a and the O ring 313 are inserted in an end portion of the through hole 310b of the joint 310a. As a result, the O ring 313 is sandwiched between the inner surface of the joint 310a and the outer surface of the insertion portion 311a. A screw hole 256 is provided on the rear end surface of the holding member 311. The holding member 311 is provided with a through hole 311b for wiring.

As in the case of the holding member 311, the holding member 312 has an insertion portion 312a. The insertion portion 312a extends along the axis 9, and has a substantially cylindrical shape. An O ring 314 is mounted on the outer surface of the insertion portion 312a. The insertion portion 312a and the O ring 314 are inserted in the end portion of the through hole 310b of the joint 310a at the opposite side to the holding member 311. As a result, the O ring 314 is sandwiched between the inner surface of the joint 310a and the outer surface of the insertion portion 312a. A screw hole 257 is provided in the rear end surface of the holding member 312.

As described above, the holding members 311 and 312 hold the joint 310a of the intermediate portion 310 therebetween through the O rings 313 and 314, thereby sealing the articulation 5 and the intermediate portion 310. Furthermore, the O rings 313 and 314 are slidably in contact with the inner surface of the joint 310a. Therefore, the intermediate portion 310 is able to swing around the axis 9 with respect to the holding members 311 and 312. The insertion portions 311a and 312a form a swing shaft.

An end of the cable 330 for wiring is electrically connected to the control circuit 316. The other end of the cable 330 is connected to the switch circuit 322 in the grip 32. The operating power of the control circuit 316 is supplied via the cable 330. The cable 330 passes through the hollow portion of the intermediate portion 310, the through hole 310b of the joint 310a and the through hole 311b of the holding member 311.

The support plate 328 is fixed to the proximal end of the articulation 5 using screws. Two holes penetrating through the support plate 328 are formed in the support plate 328. The screws 251 and 252 are inserted in these holes. The distal ends of the screws 251 and 252 project from the support plate 328. These distal ends are screwed in the screw holes 256 and 257 of the holding members 311 and 312, whereby the support plate 328 is fixed to the rear end surfaces of the holding members 311 and 312.

The support plate 328 has such a shape that two flat plates different in area are coaxially overlapped with each other. An O ring 329 is mounted on the outer periphery of the flat plate having the smaller area. The support plate 328 is accommodated in the grip 32. The O ring 329 is sandwiched between the inner surface of the grip 32 and the outer peripheral surface of the support plate 328, thereby sealing the grip 32.

A through hole for wiring is formed in the support plate 328 in addition to the screw holes. The cable 330 passes through the through hole and extends to the switch circuit 322 in the grip 32.

Figure 5:
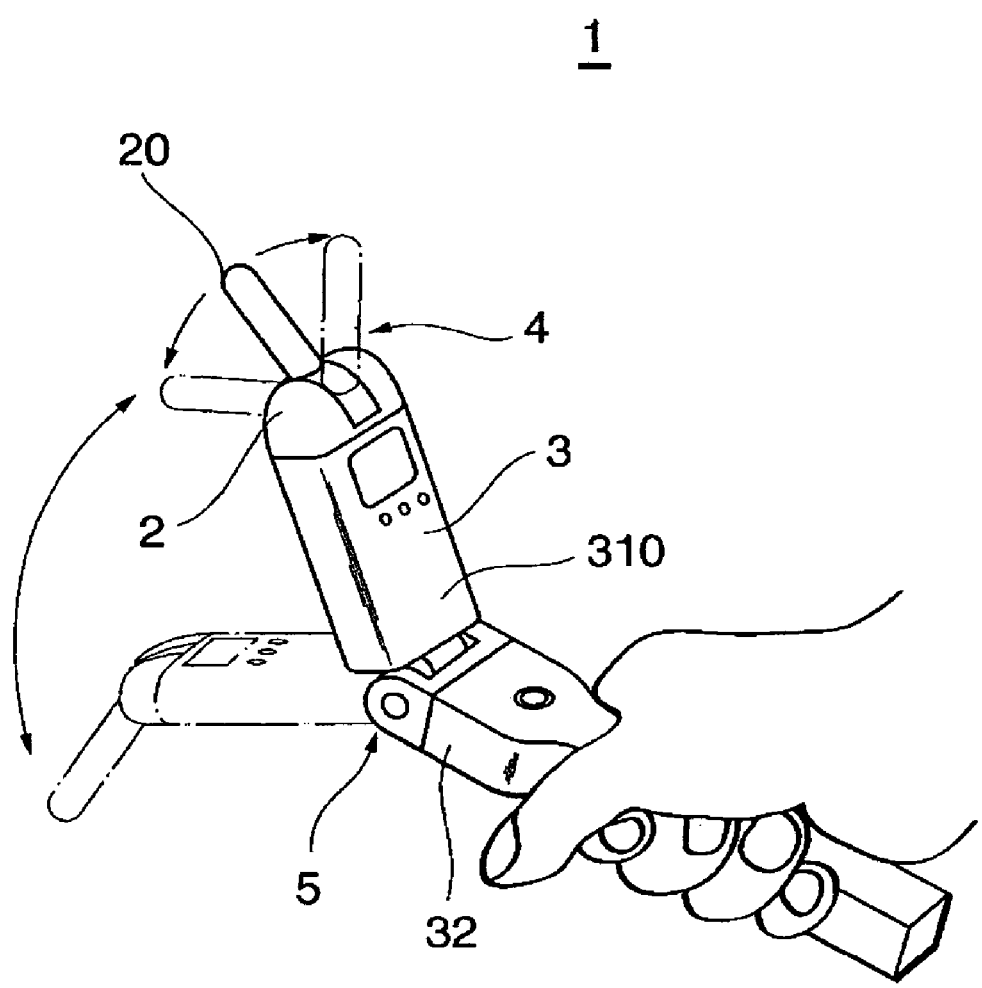
FIG. 5 is a perspective view showing the motion of the radiation detector.

The advantages of this embodiment will now be described with reference to FIG. 5. FIG. 5 is a perspective view showing the motion of the radiation detector 1. The radiation detector 1 has the two articulations 4 and 5, and thus it is movable at the two positions. Hence the radiation detector 1 has improved ease of operation. With respect to the swing motion of the probe 20 through the articulation 4, the angle of the probe 20 is adjustable with respect to the intermediate portion 310. Furthermore, with respect to the swing motion of the intermediate portion 310 through the articulation 5, the angle of the intermediate portion 310 is adjustable with respect to the grip 32. Not only the angle of the probe 20, but also the angle of the intermediate portion 310 can be adjusted, so that the probe 20 can be easily aimed at desired places to be examined. Thus, according to the radiation detector 1, radiation can be quickly detected.

Second Embodiment

Figure 6A:
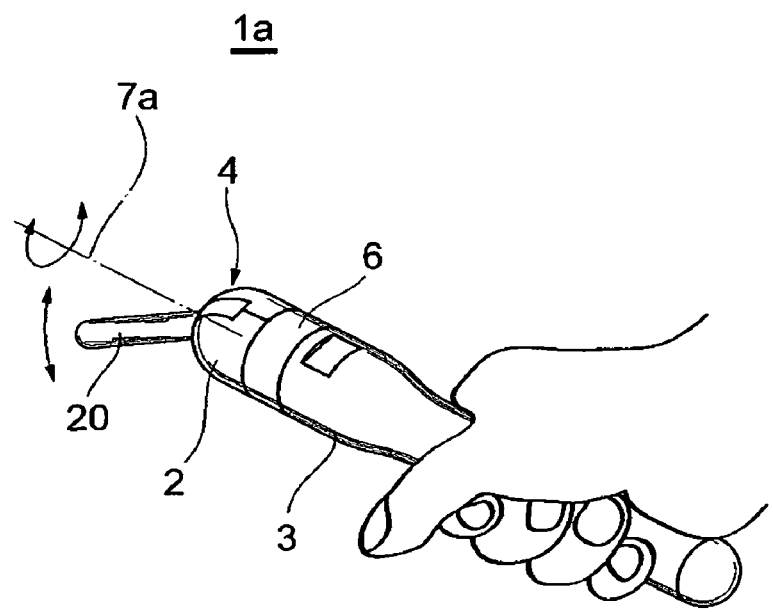
FIG. 6A and FIG. 6B are perspective views showing the motion of a radiation detector according to a second embodiment.
Figure 6B:
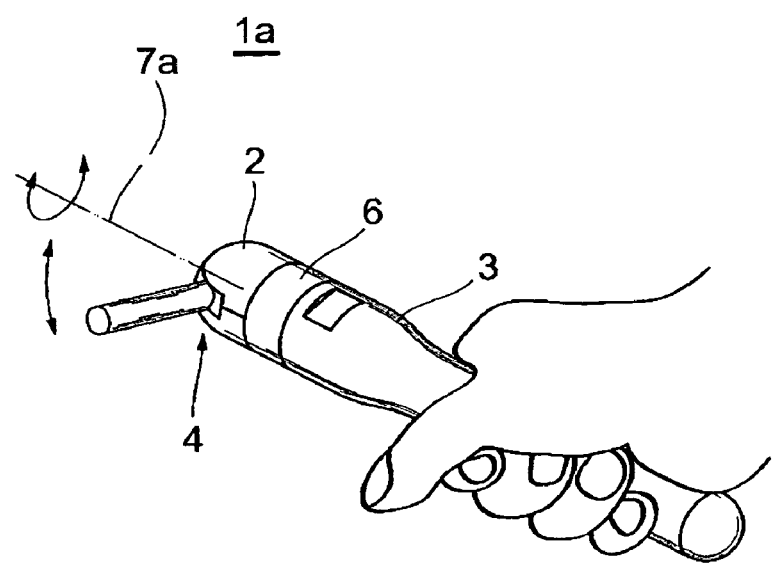

A radiation detector 1a according to a second embodiment will now be described. FIGS. 6A and 6B are perspective views showing the motion of the radiation detector 1a. As shown in FIG. 6A, the radiation detector 1a has an articulation 6 provided between the head 2 and the main body 3 in addition to the articulation 4 provided on the head 2. As shown in FIG. 6B, the articulation 6 enables the head 2 to rotate with respect to the main body 3. The head 2 is rotatable around an axis 7a. Not only can the angle of the probe 20 be adjusted by the articulation 4, but also the head 2 can be rotated by the articulation 6, so that the radiation detector 1a has excellent ease of operation. Consequently, the probe 20 can be easily aimed at desired places to be examined to quickly detect the radiation.

Figure 7:
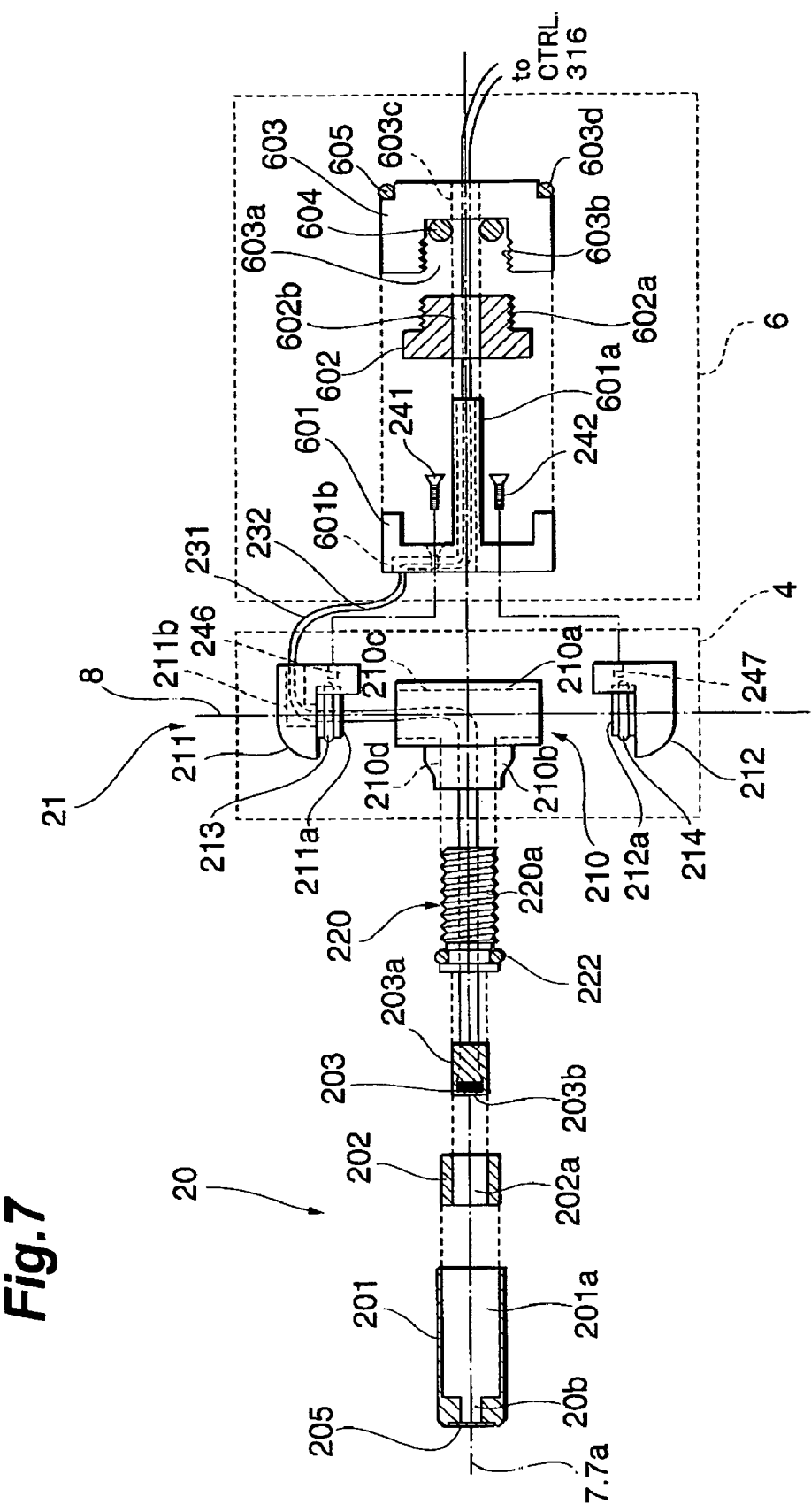
FIG. 7 is an exploded partial cross-sectional view showing the structure of the head and articulation of the radiation detector.
Figure 8:
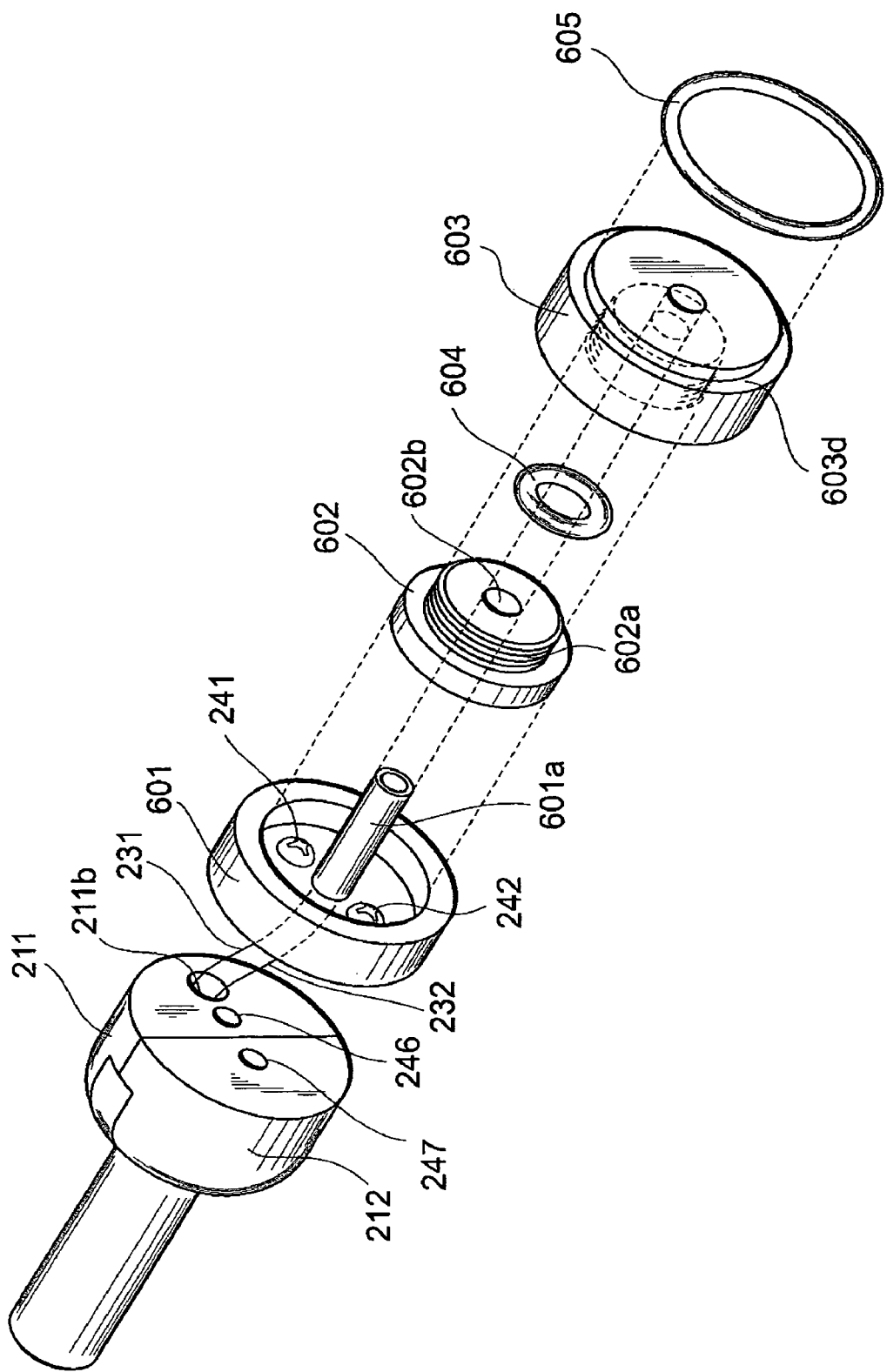
FIG. 8 is an exploded perspective view showing the structure of the articulation of the radiation detector.
Figure 9:
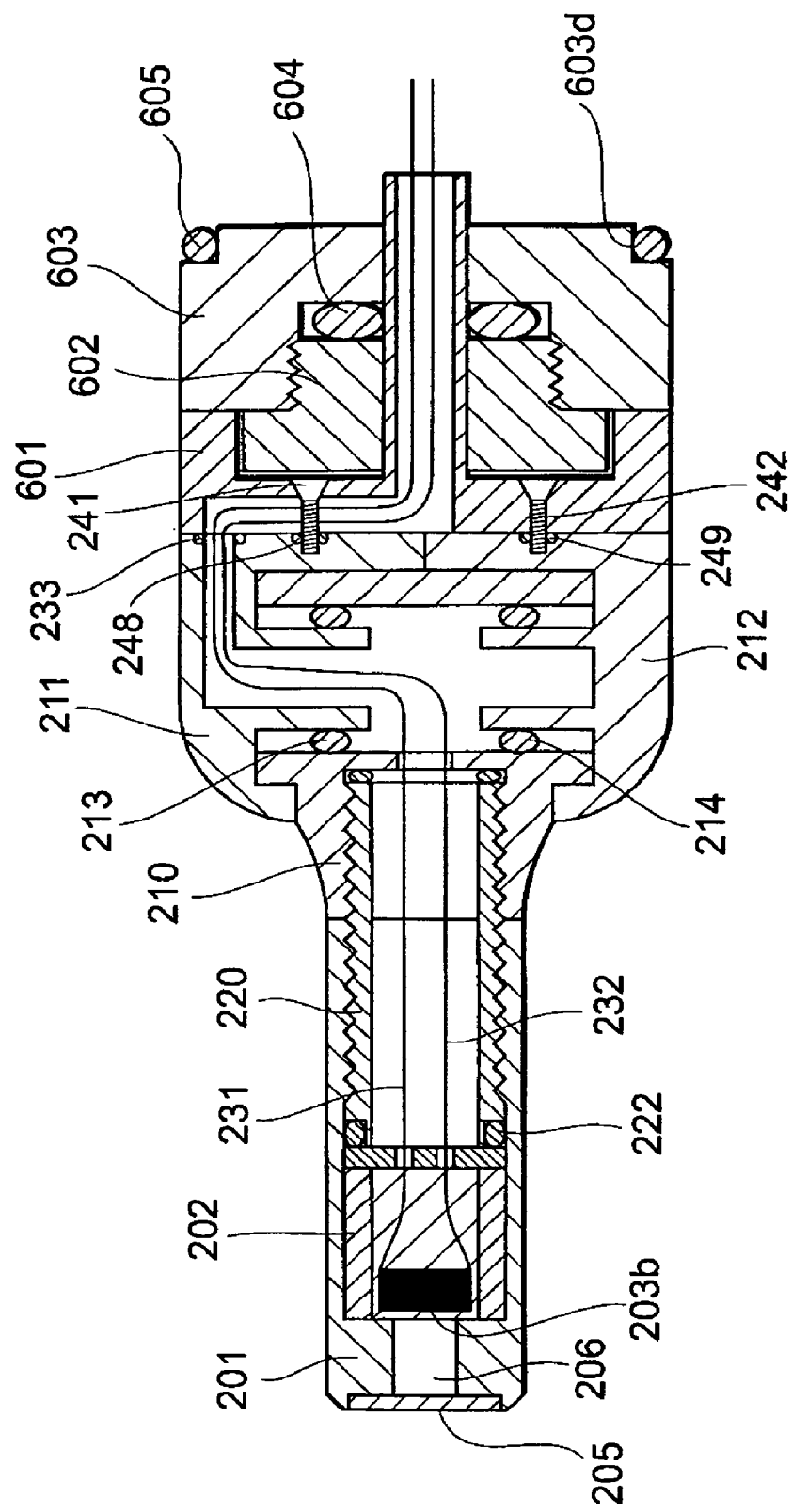
FIG. 9 is a cross-sectional view showing the head and articulation of the radiation detector.

The structure of the articulation 6 will now be described in detail with reference to FIGS. 7 to 9. FIG. 7 is an exploded partial cross-sectional view showing the structures of the head 2 and the articulation 6. FIG. 8 is an exploded perspective view showing the structure of the articulation 6, and FIG. 9 is a cross-sectional view showing the head 2 and the articulation 6. The structure of the head 2 is the same as the first embodiment, and the description thereof is omitted.

The articulation 6 has a head supporting member 601, a sleeve 602 and a main body fixing member 603. Assembling these elements enables the sleeve 602 and the main body fixing member 603 to rotate with respect to each other.

The head supporting member 601 has a disc-shaped bottom wall and a cylindrical side wall extending vertically from the bottom wall. A cylindrical shaft 601a extends from the center of the bottom wall vertically with respect to the bottom wall. The shaft 601a is longer than the side wall of the head supporting member 601. Two holes penetrating through the head supporting member are formed in the head supporting member 601. Screws 241 and 242 are inserted in these holes. The distal ends of the screws 241 and 242 project from the bottom surface of the head supporting member 601. These distal end ends are screwed in the screw holes 246 and 247 of the holding members 211 and 212, whereby the head supporting member 601 is fixed to the rear end surfaces of the holding members 211 and 212. At this time, the center axis of the shaft 601a is substantially coincident with the center axis 7 of the probe 20. The head supporting member 601 has a through hole 601b for wiring. The hole 601b penetrates through the bottom wall and the shaft 601a. Lead wires 231 and 232 bonded to the radiation detection element 203 pass through the through hole 601b.

The sleeve 602 is slidably mounted on the head supporting member 601. The sleeve 602 is fitted inside the side wall of the head supporting member 601. The sleeve 602 has a disc-shaped bottom wall, and a support shaft portion 602a extending vertically from the center of the bottom wall. A male screw is formed in the outer surface of the support shaft portion 602a along the peripheral direction thereof. The sleeve 602 has a hole 602b penetrating through the bottom wall and the support shaft portion 602a. When the sleeve 602 is fitted in the head supporting member 601, the shaft 601a of the head supporting member 601 is inserted in the hole 602b. Correspondingly, the distal end of the shaft 601a is projected from the support shaft portion 602a.

The main body fixing member 603 has a substantially disc-shaped upper wall and a cylindrical side wall extending vertically from the upper wall. The main body fixing member 603 has an opening portion 603a for accommodating the shaft supporting portion 602a of the sleeve 602. A female screw is formed along the peripheral direction in the side surface of the opening portion 603a. When the shaft supporting portion 602a is screwed in the opening portion 603a, the male screw of the shaft supporting portion 602a is engaged with the female screw of the opening portion 603a, whereby the sleeve 602 and the main body fixing member 603 are joined to each other. A through hole 603c is formed in the upper wall of the main body fixing member 603. The distal end of the shaft 601a projecting from the shaft supporting portion 602a is inserted in the through hole 603c.

As shown in FIG. 9, an O ring 604 is mounted on the shaft 601a. The O ring 604 is sandwiched between the upper end of the shaft supporting portion 602a and the upper wall of the main body fixing member 603 while it is in close contact with the surface of the shaft 601a, thereby sealing the articulation 6.

An annular recess portion 603d in which an O ring 605 is mounted is provided on the periphery of the upper wall of the main body fixing member 603. The annular recess portion 603d is accommodated in the intermediate portion 310. The O ring 605 is sandwiched between the inner surface of the intermediate portion 310 and the outer surface of the main body fixing member 603, thereby sealing the intermediate portion 310.

With the above structure, the head supporting member 601 can rotate relatively to the sleeve 602 and the main body fixing member 603 using the shaft 601a as a rotating shaft. The head 2 is fixed to the head supporting member 601, and thus the head 2 can be rotated. The rotational axis 7a is perpendicular to the swing axis 8 of the probe 20.

Third Embodiment

Figure 10:
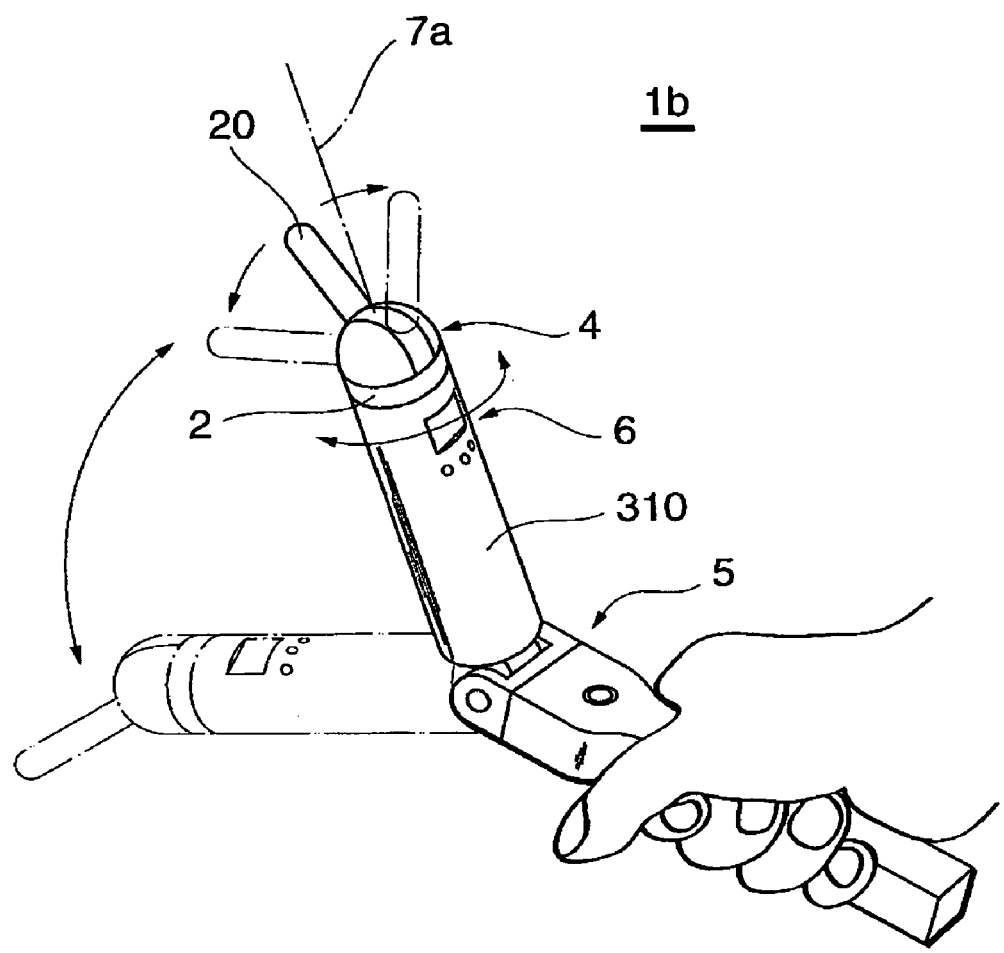
FIG. 10 is a perspective view showing the motion of a radiation detector according to a third embodiment.

A radiation detector 1b according to a third embodiment will now be described with reference to FIG. 10. FIG. 10 is a perspective view showing the motion of the radiation detector 1b. As shown in FIG. 10, the radiation detector 1b has the articulation 5 provided on the main body 3 and the articulation 6 provided between the head 2 and the main body 3 in addition to the articulation 4 provided on the head 2. The structures of these articulations have been already described above.

The radiation detector 1 is able to move at the three positions, and thus the ease of operation thereof is further improved. Flexibility of adjusting the orientation of the probe 20 is very high, so that the probe 20 can be easily aimed at the desired place to be examined to quickly detect the radiation.

Fourth Embodiment

Figure 11:
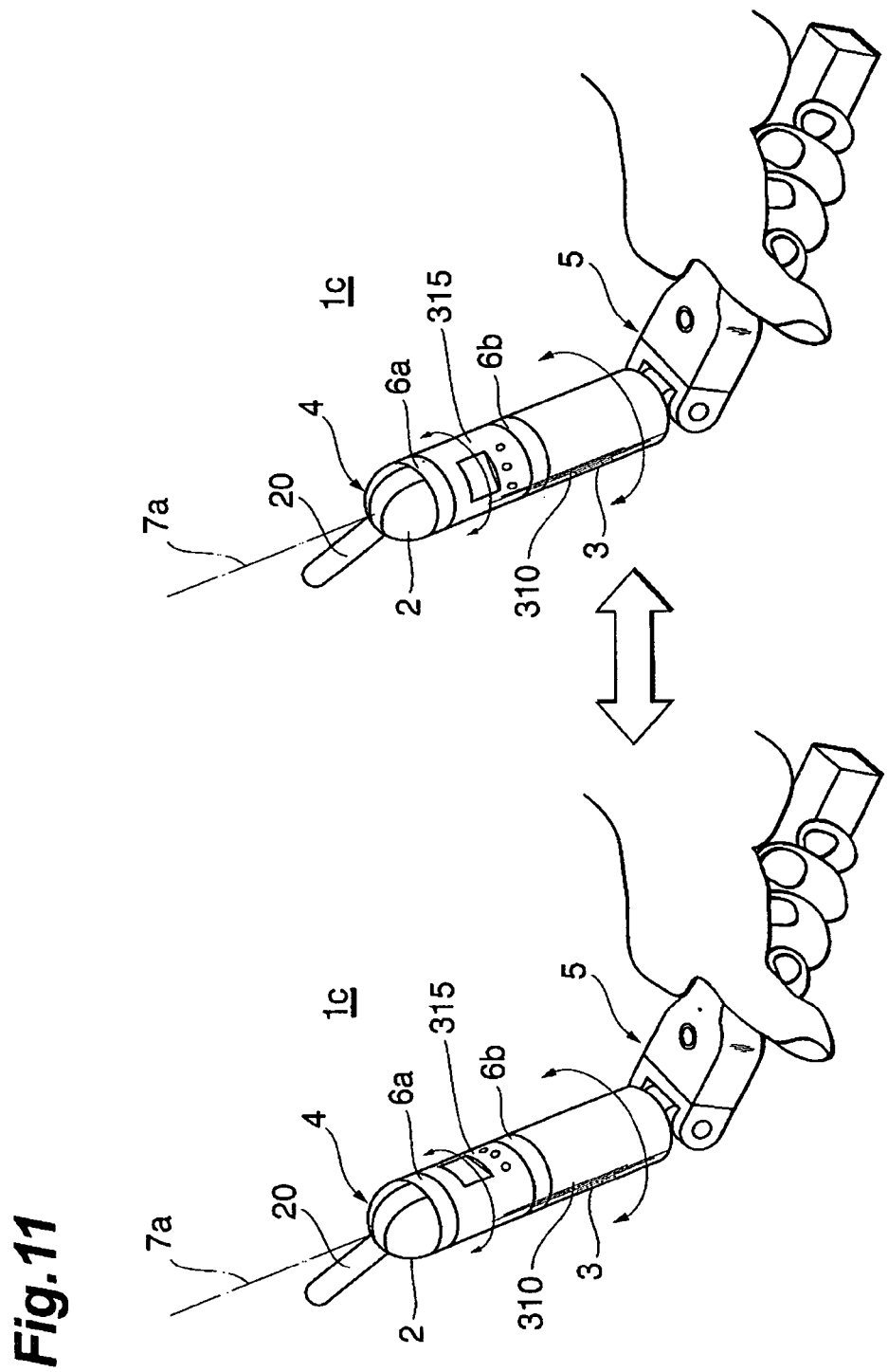
FIG. 11 is a perspective view showing the motion of a radiation detector according to a fourth embodiment.

A radiation detector 1c according to a fourth embodiment will now be described with reference to FIG. 11. FIG. 11 is a perspective view showing the motion of the radiation detector 1c. The radiation detector 1c has two articulations 6a and 6b in addition to the articulations 4 and 5. The articulation 6a is provided between the head 2 and the main body 3. The articulation 6b is provided on the intermediate portion 310. The display section 315 is located between the articulation 6a and the articulation 6b. Each of these articulations 6a and 6b is a rotating mechanism having the same structure as the articulation 6 of the second embodiment. Thus the articulation 6a enables the head 2 to rotate around the axis 7a. The articulation 6b enables the display section 315 to rotate around the axis 7a. The display section 315 sandwiched between the articulations 6a and 6b can be rotated independently of the head 2. Therefore, the user can adjust the orientation of the display section 315 solely to set the display section 315 easily visible. Therefore, when adjusting the orientation of the display section 315, it is unnecessary to vary the orientation of the probe 20. This contributes to quick detection of radiation.

Fifth Embodiment

Figure 12:
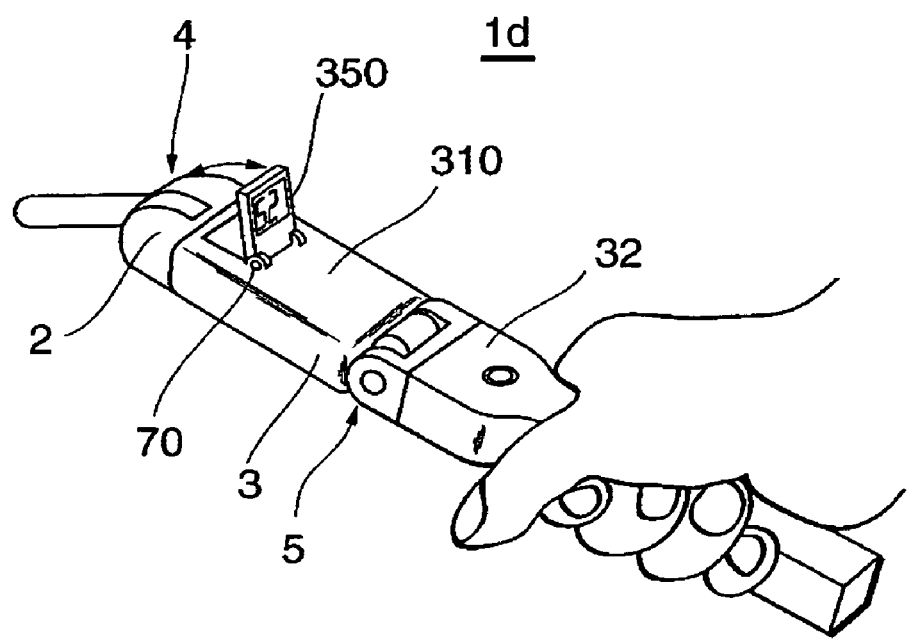
FIG. 12 is a perspective view showing a radiation detector according to a fifth embodiment.

A radiation detector 1d according to a fifth embodiment will now be described with reference to FIG. 12. FIG. 12 is a perspective view showing the radiation detector 1d. The radiation detector 1d has a display section 350 which can move independently of the head 2 and the main body 3. The display section 350 is placed on the side wall of the intermediate portion 310. The display section 350 is designed in a planar shape, and fixed to the intermediate portion 310 via a hinge 70. Accordingly, the display section 350 is able to swing around an axis with respect to the remaining portion of the intermediate portion 310. The user can erect the display section 350 from the main body 3 as necessary. The user can adjust the orientation of the display section 350 without varying the angle of the probe 20 or the intermediate portion 310 so that the display section 350 is easily viewable. This contributes to quick detection of radiation. Since the side wall of the intermediate portion 310 exists under the display section 350, the sealing of the detector 1d is maintained when the display section 350 is moved.

Sixth Embodiment

Figure 13:
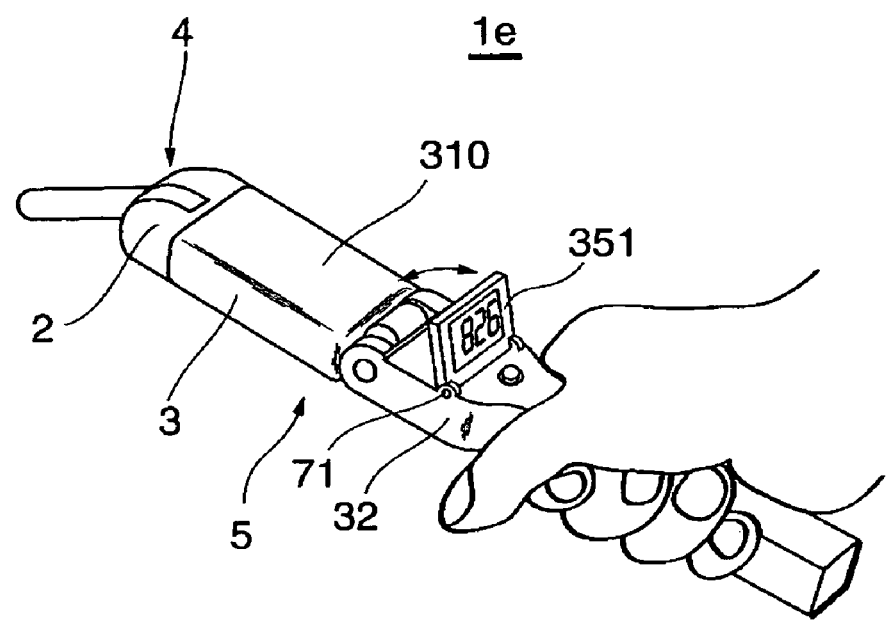
FIG. 13 is a perspective view showing a radiation detector according to a sixth embodiment.

A radiation detector 1e according to a sixth embodiment will now be described with reference to FIG. 13. FIG. 13 is a perspective view showing the radiation detector 1e. The radiation detector 1e has the display section 351 capable of moving independently of both the head 2 and the main body 3. The display section 351 is placed on the side wall of the grip 32. The display section 351 is designed to have a planar shape, and fixed to the grip 32 via the hinge 71. Accordingly, the display section 351 is able to swing around an axis with respect to the remaining portion of the grip 32. The user can erect the display section 351 from the grip 32 as necessary.

The user can adjust the orientation of the display section 351 without varying the angle of the probe 20 or the intermediate portion 310 so that the display section 351 is easily viewable. This contributes to quick detection of radiation. Since the side wall of the grip 32 exists under the display section 351, the sealing of the detector 1e is maintained when the display section 351 is moved.

The present invention has been described in detail on the basis of the embodiments thereof. However, the present invention is not limited to the above embodiments. Various modifications may be made to the present invention without departing from the gist thereof.

Figure 14:
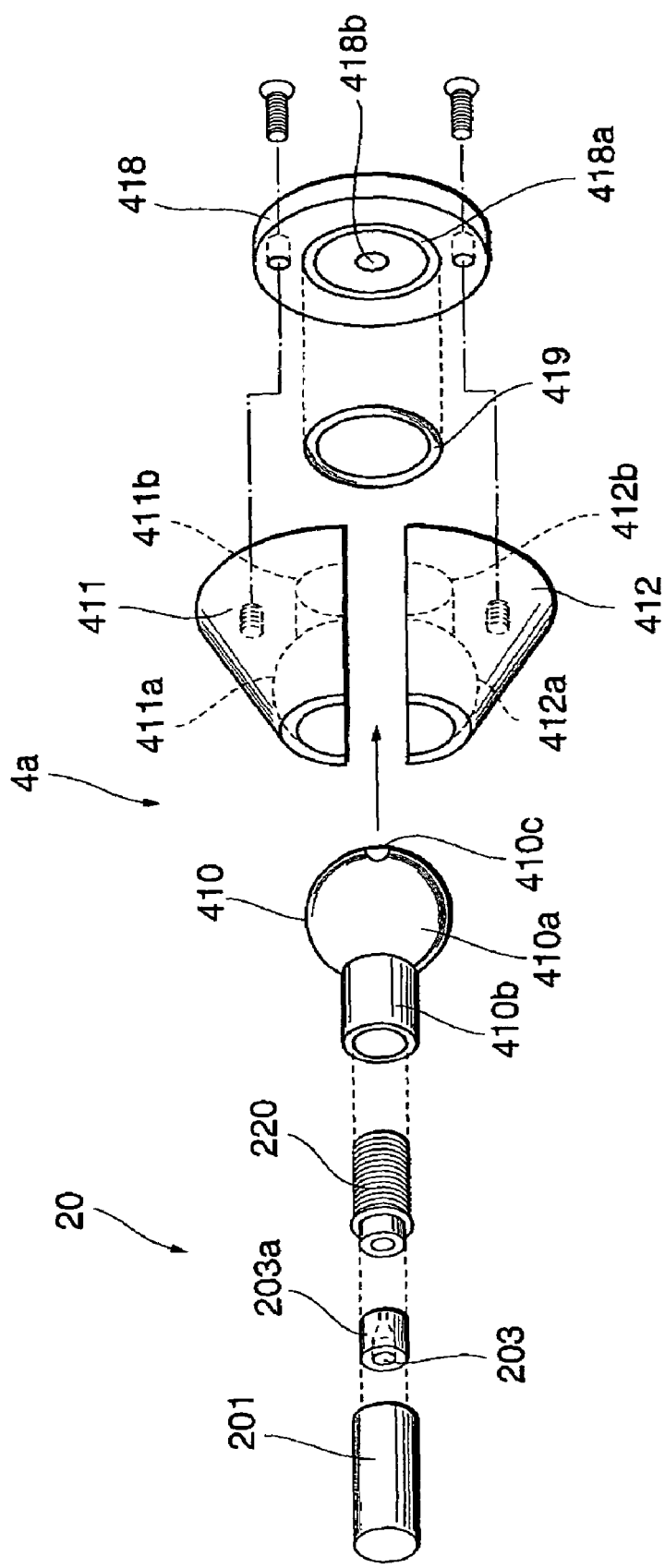
FIG. 14 is a perspective view showing the structure of a ball joint type articulation.

In the above embodiments, the articulation 4 for enabling the probe 20 to swing is used as the moving mechanism for the head 2. However, other moving mechanisms may be used. For example, a ball joint mechanism as shown in FIG. 14 may be provided on the head 2. The ball joint type articulation 4a has a probe fixing member 410 and holding members 411 and 412. The probe fixing member 410 has a ball portion 410a and a cylindrical portion 410b projecting from the ball portion 410. A through hole 410c for wiring is formed in the ball portion 410a. The cylindrical portion 410b has a connection pipe screw 220 accommodated therein. A female screw is formed in the inner surface of the cylindrical portion 410b so as to be engaged with the connection pipe screw 220. The holding members 411 and 412 have hollow portions 411a and 412a for accommodating the ball portion 410a therein, and through holes 411b and 412b for wiring. Screw holes are formed in the rear end faces of the holding members 411 and 412.

A support member 418 is fixed to the rear end surfaces of the holding members 411 and 412 via the O ring 419. The O ring 419 is disposed in an annular groove 418a formed in the front end face of the support member 418. The O ring 419 is sandwiched between the rear end faces of the holding members 411 and 412 and the front end face of the support member 418, thereby sealing the articulation 4a. The support member 418 has a through hole 418b for wiring. A lead wire connected to the radiation detection element 203 passes through the through hole 410c of the probe fixing member 410, the through holes 411b and 412b of the holding members 411 and 412 and the through holes 418b of the support member 418.

The support member 418 is fixed to the intermediate portion 310, whereby the articulation 4a and the probe 20 are connected to the main body 3. Since the articulation 4a is of a ball joint type, the probe 20 is able to swing along various directions. Therefore, the orientation of the probe 20 can be easily adjusted.

The combination of the above articulations 4, 4a, 5 and 6 are not limited to those of the above embodiments, and any combination may be adopted.

INDUSTRIAL APPLICABILITY

As described above, the radiation detector of the present invention has the second articulation in the head or the main body or therebetween in addition to the first articulation for enabling the probe to move, so that the ease of operation thereof is improved. Accordingly, using the radiation detector of the present invention makes it possible to quickly detect radiation. Particularly, when the second articulation enables the head to rotate, the probe can be very easily aimed at the desired place to be examined. Furthermore, when the second articulation is connected to the display section so that the display section is movable, the probe can be aimed at the desired place to be examined with maintaining the display section at the easily visible position. This makes it easier to detect the radiation.

Thus the present invention can provide a radiation detector having improved ease of operation.

The invention claimed is:

1. A radiation detector comprising:
   a main body, the main body comprising a grip;
   a head coupled to an end of the main body, the head comprising a probe containing a radiation detection element, the main body comprising an intermediate portion coupled between the grip and the head;
   a first articulation coupling the probe and another portion of the head and enabling the probe to move with respect to the other portion of the head; and
   a second articulation coupling the intermediate portion and the grip and enabling the intermediate portion to swing with respect to the grip.

2. The radiation detector according to claim 1, wherein the second articulation enables the head to move with respect to the grip.

3. The radiation detector according to claim 1, wherein a third articulation is provided between the head and the main body and enables the probe and the first articulation to rotate around a longitudinal axis of the intermediate portion.

4. The radiation detector according to claim 3, further comprising
   a display section provided on the main body; and
   a fourth articulation connected to the display section, the fourth articulation enabling the display section to rotate around a longitudinal axis of the intermediate portion with respect to the head and the grip.

5. The radiation detector according to claim 4, wherein at least the first, second and third articulations are sealed.

6. The radiation detector according to claim 3, wherein the first, second and third articulations are sealed.

7. The radiation detector according to claim 1, further comprising a display section provided on the main body, wherein the second articulation is coupled to the display section to enable the display section to move.

8. The radiation detector according to claim 7, wherein a third articulation enables the display section to rotate around a longitudinal axis of the intermediate portion with respect to the head and the grip.

9. The radiation detector according to claim 7, wherein the display section is movable independently of the remaining portion of the main body.

10. The radiation detector according to claim 9, wherein the display section is able to swing with respect to the remaining portion of the main body.

11. The radiation detector according to claim 1, wherein the first articulation enables the probe to swing with respect to the other portion of the head.

12. The radiation detector according to claim 11, wherein the first articulation enables the probe to swing around a first axis and the second articulation enables the intermediate portion to swing around a second axis that is parallel to the first axis.

13. The radiation detector according to claim 1, wherein
   the radiation detection element has a detection face for receiving radiation and generating an electrical output in response to incidence of radiation on the detection face, and
   wherein the probe further has a collimating opening extending from an end of the probe to the detection face and collimating radiation incident on the detection face.

14. The radiation detector according to claim 1, wherein the first and second articulations are sealed.

15. The radiation detector according to claim 1, wherein the main body includes a display screen and the first articulation is configured to enable the probe to swing with respect to the other portion of the head around an axis substantially perpendicular with respect to the longitudinal axis of the intermediate portion and substantially parallel with respect to the display screen.

16. The radiation detector according to claim 1, wherein the probe has a smooth, indentation-free surface.

17. The radiation detector according to claim 1, where the probe has a cross section at its distal end away from the main body of the radiation detector that is not larger than the cross section of the probe at its proximal end adjacent the main body of the radiation detector.

18. The radiation detector according to claim 1, where the intermediate portion has a cross section at its distal end away from the grip of the main body of the radiation detector that is not larger than the cross section of the intermediate portion at its proximal end adjacent the grip of the main body of the radiation detector.

* * * * *